United States Patent [19]

Fauveau et al.

[11] 4,017,378
[45] Apr. 12, 1977

[54] BINDERS FOR ELECTRODES

[75] Inventors: Christian Pierre Maurice Fauveau, Lavera; Albert Julus Lucien Bonzom, Sausset les Pins; Anne Marie Eugenie Moutard nee Andre, Paris, all of France

[73] Assignee: The British Petroleum Company Limited, London, England

[22] Filed: Nov. 11, 1974

[21] Appl. No.: 522,911

[30] Foreign Application Priority Data

Nov. 12, 1973 France .............................. 73.40152

[52] U.S. Cl. .................................. 208/41; 208/44; 208/67; 423/448
[51] Int. Cl.² ....................................... C10G 37/06
[58] Field of Search ................. 208/22, 44, 76, 67, 208/41, 42

[56] References Cited

UNITED STATES PATENTS

| | | | |
|---|---|---|---|
| 2,752,290 | 6/1956 | Beattie | 208/131 |
| 3,537,976 | 11/1970 | Alexander et al. | 208/76 |
| 3,794,579 | 2/1974 | Enomoto et al. | 208/22 |

*Primary Examiner*—Herbert Levine
*Attorney, Agent, or Firm*—Morgan, Finnegan, Pine, Foley & Lee

[57] ABSTRACT

A binder suitable for use in electrodes is prepared by distilling a residue boiling above 200° C from steam cracking to give a material with a KS softening point of 55° – 90° C and thermally ageing the material to increase the KS softening point to 80° – 100° C.

The residue may be obtained from the steam cracking of naphtha. The thermal ageing may be carried out by heating under reflux or by recycling the residue at the base of the distillation column.

The binder preferably has a KS softening point of 88° – 100° C a density above 1.20, a Conradson carbon index of 45 – 60, a beta resin content of 20 – 35% wt and an alpha resin content below 10% wt.

5 Claims, No Drawings

BINDERS FOR ELECTRODES

The present invention relates to a process for the manufacture of binders for electrodes, which can be used in electrometallurgy, from residues from the steam cracking of petroleum fractions.

Various industries use hydrocarbon binders usually obtained by the distillation of coal tar. These binders may be used for the agglomeration of coal breeze in the manufacture of pellets or briquettes; or as binders for petroleum cokes used in the manufacture of electrodes for the aluminum and other electrometallurgical industries. Coal tar pitches are suitable for these applications, because, being of an aromatic nature they have a high density, and a high ratio of carbon to hydrogen. However, coal tar pitch is not always readily available.

One of the by-products obtained from the cracking of petroleum gas oil or naphtha to produce ethylene is a residue. This residue, boiling mainly above 200° C, is produced in fairly large quantities but is practically unusable except as a fuel. Attempts have previously been made to prepare a binder from such residues by blowing in the presence of catalysts, but the pitches obtained have had very limited potential.

A process is also known for the manufacture of pitch binders for carbon electrodes from aromatic tars obtained by the steam cracking of gasoil. This process consists in thermally treating the aromatic tar obtained, and fluxing the resultant material with a hydrocarbon fraction or evaporating it at a pressure higher than atmospheric pressure.

However, this process does not make it possible to obtain in a simple manner a binder which is suitable for electrodes. In fact, the 2-stage treatment, although giving a desirable increase in the content of beta resins also usually gives a product with a softening point higher than 100° C, which is undesirably high for binders for the manufacture of electrodes. Furthermore, the process requires the use of high temperatures e.g. between 400° and 500° C and/or the use of extraneous petroleum fractions.

A binder intended for the manufacture of electrodes should have a softening point which is not more than 100° C and preferably not more than 90° C. It should also have a high density, a high Conradson carbon index, a high content of beta resins and a low content of alpha resins.

Beta resins are resins which are insoluble in benzene and soluble in anthracene oils; they give the pitches the quality of graphitability which is sought after in the manufacture of electrodes and which leads to an improved electrical conductivity.

Alpha resins aare resins which are insoluble in anthracene oil, and whose graphitability is low; their content in the binder should be kept as low as possible.

A high Conradson carbon index means that a larger quantity of carbon remains in the electrodes after calcination, which in turn increases the overall yield of electrodes.

The softening point should be such that during the mixing of the coke and pitch there is a good coating of the coke. The use of a pitch which has too high a softening point gives a porosity which shortens the working life of the electrodes as a result of attack by the gases emitted during the electrolysis.

The principal problem posed in the manufacture of such binders is that of obtaining a binder having a softening point which is not more than 100° C and a high density, i.e. greater than about 1.15. If the density is high, the softening point has a tendency to be also too high; on the other hand, if the softening point if lower than 100° C, the density has a tendency to be lower than 1.15. Also, if the electrode containing a binder is to be produced in a high yield, and have a high electrical conductivity and a long working life, the binder must posses a softening point which is lower than 100° C, a high content of beta resins and a high Conradson carbon index. But the softening point, the Conradson carbon index and the content of beta resins all tend to move in the same direction, that is to say that when one tries to obtain a low softening point, the Conradson carbon index and the content of beta resins also have a tendency to be low, and when one wishes to obtain a high content of beta resins and a high Conradson carbon index, the softening point has a tendency to exceed 100° C.

The Applicants have not found that it is possible to obtain, in high yield, binders for electrodes which have a high Conradson carbon index, a high content of beta resins and a high density, and a softening point which is not more than 100° C.

The process also gives binders suitable for use in electrodes, using temperature lower than those of known processes, and without using extraneous petroleum fractions.

The process of the present invention comprises, essentially, the distillation, preferably under atmospheric pressure, of a steam cracking residue followed by a thermal ageing stage not requiring the use of additional fractions.

According to the present invention, a process for the manufacture of binders suitable for use in electrodes comprises distilling a residue boiling predominantly above 200° C obtained from the high temperature cracking of a petroleum fraction to give a material having a KS softening point of from 55° to 90° C and thermally ageing the material to increase the KS softening point to between 80° and 100° C.

The distillation is preferably carried out at atmospheric pressure.

By high temperature cracking is meant cracking at a temperature of at least 593° C, particularly 593° to 900° C. Such cracking is usually carried out in the presence of steam to produce normally gaseous olefins from normally liquid petroleum fractions. The feedstock is usually naphtha although heavier fractions e.g. gas oil or even crude oil have been proposed. Besides normally gaseous olefins, a normally liquid product is also obtained. The liquid fraction boiling up to 200° C can be used, after hydrogenation, as a high octane gasoline component or as a source of aromatics but, as indicated previously, the residue boiling above 200° C has very little value. The residue is separated from the gasoline by distillation and since no distillation is perfect, the residue may contain a small amount of material boiling below 200° C, usually less than 10% volume.

The KS softening point is the Kraemner Sarnow softening point as determined by AFNOR T 67/001.

The KS softening point after the distillation is preferably between 60° and 80° C. During the distillation the temperature of the residue may be between 150° and 450° C, preferably between 200° C and 420° C. The yield of residue after distillation may be between 38 and 71 percent by weight, preferably between 50 and 68 percent. Under these conditions, thermal action induces a condensation of aromatic rings and increases the carbon/hydrogen ratio as well as the density of the final pitch.

The ageing which constitutes the second stage of the process may be carried out at a temperature of between 350° and 450° C, preferably operating at atmospheric pressure during a period of between 1 and 20 hours, preferably between 2 and 10 hours. The ageing can be carried out by recycling or by establishing a reflux of the volatile components until the desired softening point is reached. This ageing causes a significant increase in the content of beta resins in the pitch.

In order to obtain a binder which complies with the characteristics cited above, one preferably ages a pitch obtained by atmospheric distillation and possessing a KS softening point of approximately 62° C, until one obtains a KS softening point of between 80 and 100° C.

The said ageing may be carried out, for example, by recycling the pitch at the bottom of the distillation tower or by maintaining the pitch in a reactor at atmospheric pressure. During the course of the ageing a light fraction consisting mainly of aromatic hydrocarbons having from 6 to more than 12 carbon atoms, representing from 0 to 10 percent by weight, may be separated. These light fractions are then re-injected into the pitch by reflux or recycling without altering the ageing temperature. The reflux or recycling helps in the development of the desirable characteristics of the binders in situ without the incorporation of additional petroleum fractions.

A process is also known, which is used for the manufacture of coal pitches, in which the pitch is injected into the top of a tower and flows downwardly, passing through treatment zones whose temperatures get progressively higher towards the bottom of the tower, where it is eventually maintained for the time necessary to obtain the desired melting point. This process of ageing is also suitable for the manufacture of binders according to the process of the invention.

The pitches obtained by the process of the invention have high coking residues, characterised by the Conradson test (AFNOR NFT 60-116); they have Conradson indices higher than 40 and preferably between 45 and 60 and a density higher than 1.20; they also have a softening point lower than 100° C and preferably in the vicinity of 90° C; a beta resin content higher than 20 percent by weight preferably between 20 and 35% wt. and an alpha resin content lower than 10% wt., preferably lower than 5% wt.

The pitches resulting from the process to which the invention are also characterised by a low sulphur content, which is important when they are used for the manufacture of electrodes because a high sulphur content can produce dangerous vapours above electrolysis tanks; the pitches obtained also have a low metal content, which makes them suitable binders for the manufacture of electrodes which can be used in electrometallurgy.

The Examples which follow illustrate the present invention, without however restricting the invention.

EXAMPLE I

A residue from the steam cracking of naphtha was distilled. The naphtha had a density at 25° C of 0.710, an IBP above 35° C, an FBP below 180° C, and a sulphur content of less than 0.15 percent by weight. After the cracking, the residue had the following characteristics:

| | |
|---|---|
| density at 25° C | 1.045 AFNOR T 60/101 |
| viscosity at 50° C (cst) | 14.2 AFNOR T 60/100 |
| viscosity at 100° C (cst) | 2.44 AFNOR T 60/100 |
| flash point (° C) | 82 AFNOR MO 70/9 |
| Conradson carbon (% by weight) | 9.2 AFNOR T 60/116 |
| sulphur (% by weight) | 0.04 |
| ASTM distillation | |
| IBP (° C) | 185 |
| 10% by vol. (° C) | 209 |
| 50% by vol. (° C) | 247 |

The residue was distilled under atmospheric pressure discontinuously until a KS softening point of approximately 60° C was reached. The pitch was then aged by heating under reflux for 3 hours at 370° C until its KS softening point reached 100° C. The pitch obtained by the process had the following characteristics:

| | |
|---|---|
| Density at 20° C | 1.25 |
| KS softening point (° C) | 100 |
| Conradson carbon (% by weight) | 56 |
| C/H ratio | 1.60 |
| sulphur (% by weight) | 0.08 |
| beta resins (% by weight) | 26.5 |
| alpha resins (% by weight) | 4.6 |

The pitch thus obtained was suitable for the manufacture of electrodes used in the aluminium industry.

EXAMPLE II

A steam cracking residue of naphtha possessing the following characteristics was distilled under atmospheric pressure:

| | |
|---|---|
| density at 25° C | 1.056 |
| viscosity at 50° C (cst) | 40 |
| viscosity at 100° C (cst) | 6.9 |
| flash point (° C) | 105 |
| Conradson carbon (% by weight) | 12 |
| sulphur (% by weight) | 0.11 |
| ASTM distillation | |
| IBP (° C) | 108 |
| 10% vol. (° C) | 218 |
| 50% vol. (° C) | 259 |

The naphtha fraction used had a density of 0.710, an IBP above 35° C, an FBP below 180° C and a sulphur content of less than 0.15 percent by weight.

The distillation was carried out discontinuously until a pitch having a KS softening point of 76° C was obtained. The yield of the distillation was 55 percent by weight and the temperature of the product at the end of the distillation was 380° C.

The pitch was then aged by heating under total reflux for 3 hours at 365° C and at atmospheric pressure. The characteristics of the resultant product were as follows:

| | |
|---|---|
| density at 20° C | 1.20 |
| KS softening point (° C) | 90 |
| beta resins (% by weight) | 25 |
| alpha resins (% by weight) | 0.5 |
| Conradson carbon (% by weight) | 49 |
| atomic ratio C/H | 1.36 |

The binder produced was suitable for use in the manufacture of electrometallurgical electrodes.

EXAMPLE III

The same steam cracking residue as that of Example II was distilled under atmospheric pressure to obtain a pitch with a KS softening point of 65° C. The final temperature of the product was 360° C. This pitch was then aged with recycling of the light fractions for 5 hours at 385° C under atmospheric pressure. Its principal final characteristics were as follows:

| | |
|---|---|
| density | 1.22 |
| KS softening point (° C) | 100 |
| beta resins (% by weight) | 31.7 |
| Conradson carbon (% by weight) | 52.1 |

Again, a binder which could be used in the manufacture of electrometallurgical electrodes was obtained.

EXAMPLE IV

A steam cracking residue had the following characteristics:

| | |
|---|---|
| density at 25° C | 1.068 |
| viscosity at 50° C (cst) | 63.7 |
| viscosity at 100° C (cst) | 9.8 |
| flash point (° C) | 87 |
| Conradson carbon (% by weight) | 12 |
| sulphur (% by weight) | 0.11 |
| ASTM distillation | |
| initial point (° C) | 128 |
| 10% vol. (° C) | 226 |
| 50% vol. (° C) | 277 |

The residue was obtained from the steam cracking of naphtha having a density of 0.690, an IBP of 40° C, an FBP of 180° C and a sulphur content below 0.15 percent by weight.

The residue was distilled until it reached a KS softening point of 65° C. The product yield was 53 percent by weight and the final temperature of the product was 394° C. This pitch was then aged in two stages with recycling of the distilled light fractions. The first stage of ageing was for 4 hours at 400° C, giving a pitch with a density of 1.21 and a KS softening point of 67° C.

The second stage was for 4 hours at 355° C. The final pitch had the following characteristics:

| | |
|---|---|
| KS softening point (° C) | 83 |
| density at 25° C | 1.21 |
| Conradson carbon (% by weight) | 49.4 |
| beta resins (% by weight) | 30 |
| alpha resins (% by weight) | 1.8 |

The product was suitable for use as a binder for electrodes.

EXAMPLE V

A residue from the steam cracking of naphtha had the following inspection data:

| | |
|---|---|
| density at 25° C | 1.050 |
| viscosity at 50° C (cst) | 20.6 |
| viscosity at 100° C (cst) | 4.9 |
| flash point (° C) | 95 |
| Conradson carbon (% by weight) | 8.62 |
| sulphur (% by weight) | 0.06 |
| ASTM distillation | |
| 10% by vol. (° C) | 219 |
| 50% by vol. (° C) | 255 |

The naphtha used for the steam cracking had a density of between 0.690 and 0.735, an IBP higher than 35° C, an FBP below 180° C, and a sulphur content of less than 0.15 percent by weight. The steam cracking residue was distilled at atmospheric pressure to give pitch in a yield of 63% at a final product temperature of 395° C.

This pitch was then aged for 2 hours at 395° C, the aged residual pitch having the following characteristics:

| | |
|---|---|
| density at 20° C | 1.22 |
| KS softening point (° C) | 90 |
| Conradson carbon (% by weight) | 46.8 |
| beta resins (% by weight) | 21 |
| C/H ratio | 1.24 |

EXAMPLE VI

Pitches obtained according to the foregoing Examples were used for the manufacture of pre-fired electrodes. The pitch was crushed, screened and added to pre-heated crushed and screened coke in an amount of from 15 to 20%. The pitch and coke were then mixed at 150° C. The paste obtained was pressed and then fired at a temperature of from 1000° to 1200° C. After coating, the electrode obtained was ready for use and possessed the following characteristics:

| | |
|---|---|
| geometrical density (apparent) | 1.465 g/cm³ |
| real density | 2.058 g/cm³ |
| specific resistance | 7000 M/cm |
| crushing load | 330 kg f/cm³ |
| BET surface area m²/g (measurement carried out on a sample of cylindrical anode diameter 20 mm; height 15 mm). | 3.6 m²/g |

EXAMPLE VII

Pitches obtained according to Examples I to V were used for the manufacture of Soderberg electrodes.

In this case pitch/coke mixtures produced as in Examples VI were placed in a tube feeding directly to the electrode during use: the firing was produced by the heat evolved by the electrolysis bath.

We claim:
1. A process for the manufacture of binders suitable for use in electrodes, consisting of distilling at atmospheric pressure at a residue temperature of from 150° to 450° C. a residue boiling predominantly above 200° C. obtained from a high temperature cracking of a naphtha petroleum fraction, to give a pitch having a KS softening point of from 55° to 90° C. and thermally ageing the pitch at a temperature of from 350° to 450° C. and at atmospheric pressure for from 1 to 20 hours to increase the KS softening point to between 80° and 100 C., said ageing being carried out by recycling the pitch at the base of the distillation column.

2. A process as claimed in claim 1 characterised in that the residue temperature is from 200° to 420° C.

3. A process as claimed in claim 1 characterised in that the KS softening point after distillation is from 60 to 80° C.

4. A process as claimed in claim 1 characterised in that the yield of pitch after distillation is from 38 to 71% wt.

5. A process as claimed in claim 1 characterised in that the ageing is carried out by heating under reflux.

* * * * *

UNITED STATES PATENT AND TRADEMARK OFFICE
CERTIFICATE OF CORRECTION

PATENT NO. : 4,017,378
DATED : April 12, 1977
INVENTOR(S) : Christian Pierre Maurice Fauveau, Albert Julus Lucien Bonzom, Anne Marie Eugenie Moutard (nee Andre)

It is certified that error appears in the above-identified patent and that said Letters Patent are hereby corrected as shown below:

Column 2, line 20, change "not" to --now--.

Signed and Sealed this ninth Day of August 1977

[SEAL]

Attest:

RUTH C. MASON
Attesting Officer

C. MARSHALL DANN
Commissioner of Patents and Trademarks